United States Patent Office 3,518,190
Patented June 30, 1970

3,518,190
OLEOPHILIC GRAPHITE THICKENED GREASE
Aleksander Jerzy Groszek, Ealing, London, England, assignor to The British Petroleum Company Limited, London, England
No Drawing. Filed June 19, 1968, Ser. No. 738,129
Claims priority, application Great Britain, June 20, 1967, 28,320/67
Int. Cl. C10m 5/18, 5/02
U.S. Cl. 252—29                                        3 Claims

ABSTRACT OF THE DISCLOSURE

Oleophilic graphite prepared by grinding graphite and poly-tetra-fluoro-ethylene in an organic liquid has enhanced grease-thickening, load-carrying and high temperature stability.

---

This invention relates to the production of a graphite product, more particularly it relates to the production of an oleophilic graphite having modified properties. It also relates to lubricating compositions containing the modified oleophilic graphite.

Oleophilic graphite is prepared by grinding natural or synthetic graphite in certain organic liquids. It has now been found that if a fluorinated hydrocarbon is present in the grinding medium the surface area and properties of the oleophilic graphite are modified.

According to the invention an oleophilic graphite having modified properties is prepared by grinding natural or synthetic graphite in an organic liquid in the presence of a fluorinated hydrocarbon.

Oleophilic graphite will adsorb n-dotriacontane in preference to n-butanol in contrast to non-oleophilic graphite. Both natural and synthetic graphite are well-known and readily available. The synthetic material is, for example, produced from petroleum coke by heating to from 1000° to 3000° C. in a vacuum or inert gas. Typically it contains from 95 to 100% wt. carbon. The natural material may have a slightly lower carbon content than this and usually has a larger crystal size.

Oleophilic graphite has a heat of adsorption of n-dotriacontane from n-heptane of at least 700 millicalories per gram and a heat of adsorption of n-butanol from n-heptane of less than 200 millicalories per gram.

Oleophilic graphite can be obtained by grinding natural or synthetic graphite in most organic liquids but it is desirable to use one the bulk of which can be easily removed from the modified oleophilic graphite. In preparing the modified oleophilic graphite a fluorinated hydrocarbon is added to the grinding medium. Those liquids distilling below 500° C. and having a viscosity below 600 centistokes at 100° F. (38° C.) are preferred liquids for use as the grinding medium. (Liquids having a surface tension below 72 dynes/cm., preferably from 10 to 40 dynes/cm., at 25° C. are preferred.) Preferably the viscosity of the liquid is less than 30 centistokes more preferably less than 3 centistokes and most preferably less than 1 centistoke at 38° C.

Suitable organic liquids are lower molecular weight hydrocarbons, including straight-chain or branched-chain, saturated or unsaturated aliphatic compounds, saturated or unsaturated, substituted or unsubstituted, cyclo-aliphatic compounds, and subsituted or unsubstituted aromatic compounds. Examples of such compounds are n-heptane, octene - 2, 2,2,4 - trimethylpentane, cyclohexane, benzene and toluene. Branched alkyl compounds are particularly preferred. Other suitable organic liquids are those compounds which contain chlorine, or phosphorus and chlorine, for example, carbon tetrachloride.

Other suitable organic liquids are the polar oxygen compounds such as isopropyl alcohol. Silicone fluids can also be used.

For best results, the amount of graphite in the graphite/organic liquid mixture should not exceed 50% wt.; preferably it should be from 2 to 20% wt.

The grinding may be carried out in any suitable grinding mill or device and it is desirable to continue the grinding until an oleophilic graphite having a surface area (as determined by heat of absorption methods) of at least 20, preferably from 30 to 200, square metres per gram is obtained. Usually this can be achieved by grinding at normal temperatures for the required period but the temperature of the mixture may be artificially increased if desired, for example, up to 400° C. In this case, liquids which have viscosities up to 600 centistokes at 100° F. (38° C.) may be used, for example, mineral lubricating oils, ranging from "spindle" oils to "bright stocks."

One of the quickest and most effective techniques is to carry out the grinding in a vibratory ball mill. Preferably the vibratory ball mill has an amplitude of vibration of at least 2 mm. and a frequency of vibratory of at least 1,000 cycles per minute. More preferably the amplitude of vibration is at least 3 mm. and the frequency of vibration is at least 1500 cycles per minute.

It is desirable to exclude air so far as possible during the grinding operation and this can be most easily achieved by filling the mill with the organic liquid first, followed by the balls, graphite and fluorinated hydrocarbon. A suitable procedure is to fill the mill with the liquid, add half the balls, then the graphite and fluoridated hydrocarbon and finally the rest of the balls. Such a grinding procedure might be referred to as a "closed system."

A circulatory system can also be used wherein the slurry is pumped through an external magnetic filter and then returned to the mill. The circulatory system can be run semi-continuously, the slurry being pumped out after the grinding period and fresh material added to the system.

When using a ball mill, it is of course desirable to use balls made of a material which does not react with the graphite and which does not wear unduly during the grinding. Vibratory ball mills usually contain steel balls and these are suitable for the present purpose. It is preferred to use a hard grade of steel for the balls and for the grinding chamber. A magnetic filter can be used, if desired, to remove small steel particles from the slurry that is produced in the grinding operation.

As an initial step the slurry of modified oleophilic graphite that is produced in the grinding operation can be separated from the grinding balls by sieving or by displacement of the grinding liquid by another liquid and sieving.

If a relatively high boiling organic liquid is used for grinding it may be desirable to displace this liquid by a low boiling liquid. This liquid can then be removed, after sieving, by boiling. It is preferred to use vigorous boiling.

It is also possible to filter the slurry to obtain a filter cake of modified oleophilic graphite.

In either case it is preferred to remove the last traces of grinding liquid or displacing liquid by heating the oleophilic graphite in a vacuum oven for several hours, for example, at 100° C. and at 1 mm. mercury.

Alternatively and preferably, the grinding liquid or displacing liquid is not removed from the modified oleophilic graphite which remains in the slurry. This course is most preferred if the grinding liquid can also act as a base oil for a lubricating composition.

The fluorinated hydrocarbons which can be used in the present invention include the polyfluorinated and perfluorinated hydrocarbons e.g. perfluoro-alkyl-cyclohexanes such as fluoromethyl-cyclohexane and fluorocarbon polymers such as polytetrafluoroethylene (PTFE).

The latter is especially useful as it can be added as a powder mixed with the graphite.

When the fluorinated hydrocarbon to be added to the grinding medium is a liquid, it can be added in an amount ranging from a trace up to nearly all the grinding medium, though preferably it will be present in an amount of from 1% to 50% of the grinding medium.

When the fluorinated hydrocarbon is a polymeric solid e.g. PTFE, then the amount added is best considered as a percentage of the graphite added. The preferred amount of polymeric fluorinated hydrocarbon is from 0.1% to 70% by weight of the graphite, and more preferably from 1 to 55% by weight of the graphite.

It has been found that the modified oleophilic graphite has an increased surface area compared with unmodified oleophilic graphite prepared in the absence of fluorinated hydrocarbon, and has better thickening properties when added to lubricating base oils.

The modified deophilic graphite can also be dispersed a lubricating base oil to form a lubricating composition.

The lubricating base oil may be a mineral or a synthetic base oil.

Suitable mineral oils are refined mineral oils obtained from petroleum, for example, those having a viscosity at 210° F. within the range from 2 to 50 centistokes, preferably from 4 to 40 centistokes.

Synthetic lubricating oils include organic esters, polyglycol ethers, polyphenyl ethers, fluorinated hydrocarbons, silicate esters, silicone oils and mixtures thereof.

The most importnat class of synthetic oils are the organic liquid polyesters, particularly the neutral polyesters, having a viscosity at 210° F. within the range from 1 to 30 centistokes. The expression "polyester" is used to mean esters having at least two ester linkages per molecule. The expression "neutral" is used to mean a fully esterified product. Examples of suitable polyesters include liquid diesters of aliphatic dicarboxylic acids and monohydric alcohols (for example, dioctyl sebacate, dinonyl sebacate, oxtyl nonyl sebacate, and the corresponding azelates and adipates), liquid diesters of aliphatic dicarboxylic acids and phenols.

The amount of modified oleophilic graphite required to thicken the base oil will depend on the nature of the oil and the consistency of grease required. For most purposes an amount up to 50% wt., based on the final grease, will be used. However, it is remarkable that the modified oleophilic graphite can thicken oils to provide greases with very useful properties at concentrations as low as from 5 to 20% wt., based on the final grease, and this is the preferred concentration range.

The modified oleophilic graphite can be incorporated into a grease by a number of methods. It is preferred to incorporate the modified oleophilic graphite into a grease, immediately after grinding. However, if the modified oleophilic graphite is prepared some time before incorporation into the grease, it is preferred to store the modified oleophilic graphite in an air-tight container. It may also be stored as a slurry.

The following are examples of methods by which the greas: may be prepared:

(a) The grinding liquid is filtered off from the slurry of modified oleophilic graphite produced in the grinding operation. The resulting filter cake is ground by, for example, feeding the cake through a colloid mill, and the resulting powder is stirred into the oil. The grease produced is finished by colloid milling.

(b) The grinding liquid is boiled off rapidly from the slurry of modified oleophilic graphite to avoid the formation of a graphite cake, the resulting powder is stirred into the oil and the grease is finished by colloid milling.

(c) Base oil is added to the slurry of modified oleophilic graphite and the grinding liquid distilled off.

(d) Base oil is added to the slurry of modified oleophilic graphite and the mixture circulated through a homogeniser (for example, of the Manton-Gaulin type) so that temperatures up to or exceeding 140° C. are produced. The temperature must be high enough to drive off the grinding liquid.

(e) The grease may also be made directly by grinding the graphite in the base oil for the grease. For example, a low surface tension, low boiling point mineral lubricating oil with a viscosity up to 600 centistokes at 100° F. (38° C.) can be used. Elevated temperatures up to 4000° C. can be used during the grinding.

Methods (c), (d) and (e) are particularly preferred. In general, the modified oleophilic graphites can be incorporated into the base oil either at ambient temperatures or, if desired, at elevated temperatures, for example, up to 400° C.

The greases according to the invention have remarkably high Drop Points. When their drop points are measured according to the IP or ASTM standard methods, they are found to be above 400° C.: such greases are described as "infusible" and are difficult to produce by conventional methods. By using carefully selected base oils, for example, synthetic oils with high oxidation and thermal stability, greases having a unique combination of properties can be produced.

These greases have good oxidation and mechanical stability at temperatures up to about 130° C. to 140° C. when mineral oils are used as the base oils. For temperatures above this range synthetic base oils can be used. Antioxidants may also be used for the more severe operating conditions. Viscosity index improvers, metal deactivators, anti-corrosion agents etc. can also be added to the greases. Load-carrying additives can also be added to the greases according to the invention.

In general, there are two classes of test method for greases. Firstly there are what might be termed "bench tests." Secondly there are tests in specially designed bearing rigs.

It has been found that the greases according to the invention have (when compared with greases thickened by oleophilic graphite which has not been ground in the presence of a fluorinated hydrocarbon) superior thickening power as measured by penetration (a bench test), i.e. a lower percentage of graphite need be present for the same thickness of grease.

Modified oleophilic graphite can also be incorporated into base oils in quantities up to 10% wt., based on the total weight, to form dispersions with surprisingly good lubricating properties. The dispersions are remarkably stable.

The dispersions can be formed quite simply by stirring the modified oleophilic graphite into the base oil. Alternatively, a mechanical aid to dispersion such as a colloid mill can be used. In fact, any of the methods of preparation specified above for greases can be used.

The base oils used for the dispersions are the same as those used for greases and described above.

When PTFE is present in the grinding medium the modified oleophilic graphite is especially useful in the preparation of greases.

PTFE is known to be a useful solid lubricant as it has a very low coefficient of fraction, is temperature stable, and is very inert and unreactive. On account of these properties ground PTFE has been tried as a thickener for lubricating oils, but has not yet provided a satisfactory grease composition.

It is a feature of the present invention that it enables the preparation of a grease composition which contains PTFE as part of its thickener.

The effect of grinding graphite in the presence of perfluoromethyl-cyclohexane and PTFE is shown in the following table.

The grinding fluid used was n-heptane. The greases were formed by method (c), using a BG 160/95 (an oil of VI 95 and viscosity of 160 at 210° F.) base oil.

The relative surface areas were determined using the heat of adsorption of n-dotriacontane from normal heptane the heats being expressed in calories per gram of graphite. The heats of adsorption increase with the surface area of the graphites.

The greases were formed so that 15% of solids (i.e. PTFE+graphite) were added to the base oil. The amount of PTFE added to the grinding fluid was calculated as a percentage of the total weight of graphite plus PTFE.

The grease made with a thickener consisting of 75% graphite and 25% PTFE was tested in the four-ball machine for extreme-pressure properties and the results shown in Table 2.

This grease was subjected to a Skefko 4A rig test and the grease ran the full 600 hours at a mean temperature of 113° C. No inhibitor was present and after the test the consistency and appearance of the grease was similar to the fresh grease. The elements were well coated and there was no sign of wear. There was only slight lacquering.

These results show the excellent lubricating and temperature stable properties of the grease.

What I claim is:

1. A method of producing an oleophilic graphite which comprises forming a mixture which consists of less than 50% by wt. of graphite in an organic liquid distilling below 500° C., having a viscosity below 600 centistokes at 38° C., and having a surface tension below 72 dynes/cm. at 25° C. and from 0.1 to 70% by wt. of the graphite of polytetrafluoroethylene, grinding said mixture in said liquid until said graphite becomes oleophilic and has a surface area of from 20 to 200 square meters per gram.

2. An oleophilic graphite produced by the method of claim 1.

3. A lubricating composition consisting of a lubricating oil containing an effective amount of an oleophilic graphite produced by the method of claim 1.

TABLE 1

| | Oleophilic graphite | | | Grease | | |
|---|---|---|---|---|---|---|
| Grinding fluid | Fluorinated hydrocarbon | Amount of fluorinated hydrocarbon as a percentage of total solids | Heat of adsorption cals/gr. of n-dotriacontane from n-heptane | Amount of thickener percent | Amount of graphite, percent | ¼ scale penetration worked |
| n-Heptane | None | Zero | 1.15 | 15 | 15 | 335 |
| Do | PTFE | 10 | 1.32 | 15 | 13.5 | 313 |
| Do | PTFE | 25 | 1.43 | 15 | 11.25 | 313 |
| Do | PTFE | 35 | | 15 | 9.7 | 320 |
| Do | PTFE | 50 | 1.76 | 15 | 7.5 | 339 |
| Do | PTFE | 75 | 0.86 | 15 | 3.25 | No grease |
| Do | PTFE | 100 | Nil | 15 | None | No grease |
| Do | Perfluoro-methyl cyclohexane. | Liquid | | | | |

[1] These penetration values are ¼ scale penetrations converted to full scale readings by the general accepted correlation established for soap-thickened greases (ASTMD 1403-56T).

TABLE 2

| Thickener composition | Total wt. of thickener, percent | Penetration Unworked | Penetration Worked | Bleed, percent | Extreme pressure test MHL | Extreme pressure test WL | Extreme pressure test ISL |
|---|---|---|---|---|---|---|---|
| 75% 25% PTFE | 15 | 298 | 313 | 5.3 | 51 | 316 | 79 |

MHL is mean Hertz load, ISL is initial seizure load, WL is welding load.

References Cited

UNITED STATES PATENTS 3,384,583   5/1968   Groszek et al. _____ 252—29

DANIEL E. WYMAN, Primary Examiner

I. VAUGHN, Assistant Examiner

U.S. Cl. X.R.

252—58; 23—209.1, 209.2